United States Patent [19]
Bell

[11] Patent Number: 5,555,777
[45] Date of Patent: Sep. 17, 1996

[54] CRANK APPARATUS FOR A CRANKSHAFT OF A DIESEL ENGINE

[76] Inventor: John Bell, 20 Cottonwood, Babbitt, Minn. 55706

[21] Appl. No.: 500,116

[22] Filed: Jul. 10, 1995

[51] Int. Cl.⁶ .............................. F16C 11/02; F16C 9/04
[52] U.S. Cl. ..................... 74/595; 74/598; 123/197.3
[58] Field of Search .......................... 74/595, 596, 597, 74/598, 579 E, 580; 123/197.3, 197.4

[56] References Cited

U.S. PATENT DOCUMENTS

| | | | |
|---|---|---|---|
| 1,605,742 | 11/1926 | Jordan et al. | 74/579 E |
| 1,765,927 | 6/1930 | Maier | 74/598 X |
| 1,830,976 | 11/1931 | Ashworth | 74/595 X |
| 1,905,784 | 4/1933 | Alsaker et al. | 74/579 E X |
| 1,911,459 | 5/1933 | Mitchell | 74/595 X |
| 5,186,127 | 2/1993 | Cuatico | 123/197.4 X |
| 5,197,416 | 3/1993 | Zoche | 74/595 X |

FOREIGN PATENT DOCUMENTS

| | | | |
|---|---|---|---|
| 1198613 | 8/1965 | Germany | 74/579 E |
| 8607115 | 12/1986 | WIPO | 123/197.4 |

*Primary Examiner*—Charles A. Marmor
*Assistant Examiner*—Mary Ann Battista

[57] ABSTRACT

An improved crank apparatus for a crankshaft of a diesel engine including an arm extending outwardly of the crankshaft, a crank pin affixed to the arm and having a generally rectangular configuration, a split sleeve having a slot formed therein so as to receive the crank pin therein, and a piston rod affixed to the split sleeve and having an insert key affixed thereto so as to reside within the split sleeve in contact with the crank pin during a rotation of the crankshaft. The crank pin includes a first tab extending outwardly therefrom and a second tab extending outwardly from an opposite side of the crank pin. The first and second tabs extend through an opening formed in the split sleeve from the slot. These tabs include chamfered edges extending away from the generally rectangular configuration. The insert key is positioned so as to reside within an interior area of the split sleeve as the crankshaft rotates.

9 Claims, 3 Drawing Sheets

CRANK APPARATUS FOR A CRANKSHAFT OF A DIESEL ENGINE

TECHNICAL FIELD

The present invention relates to diesel engines generally. More particularly, the present invention relates to the operation of the piston of the diesel engine relative to a rotation of the crankshaft of the diesel engine.

BACKGROUND ART

Presently, diesel engines include a piston and cylinder arrangement in which the piston rod is connected to a crankshaft and supports the piston within a cylinder. The rotation of the crankshaft causes the piston rod to move upwardly and downwardly and, as a result, causes the piston to move upwardly and downwardly within the cylinder. Presently, the beginning torque of the crank is zero ft./lbs. at the top dead center to about 10° past this point. The knocking noise of an idling diesel engine is due to the beginning explosive force that continues to about 30° or more, past the top dead center torque. As a result, the early torque generated by the diesel engine is less than optimal. Because of the faulty early torque of such a diesel engine is the inadequate geometrical relationship between the piston rod and the crankshaft.

It is an object of the present invention to provide an improved crank apparatus to improve the efficiency of the crank mechanism of a diesel engine.

It is another object of the present invention to provide a crank apparatus for a diesel engine that enhances the torque at the top dead center of the crank.

It is a further object of the present invention to provide an improved crank apparatus that improves fuel economy, increases power, and eliminates the knocking noise of the diesel engine.

These and other objects and advantages of the present invention will become apparent from a reading of the attached specification and appended claims.

SUMMARY OF THE INVENTION

The present invention is an improved crank apparatus for the crankshaft of an internal combustion diesel engine which comprises an arm extending outwardly of the crankshaft, a crank pin affixed to the arm and having a generally rectangular configuration with a split sleeve having an elongated slot formed therein for receiving the crank pin therein, and a piston rod affixed to the split sleeve and having an insert key affixed thereto so as to contact the crank pin during a rotation of the crankshaft.

In the present invention, the arm includes a first arm affixed to the crankshaft, and a second arm affixed to the crankshaft in spaced parallel relationship to the first arm. The crank pin extends between the first and second arms. The first and second arms have an axis extending radially outwardly from the crankshaft. The crank pin has a flat linear surface edge offset by approximately 45° from the axis of the arms.

The crank pin has a first tab extending outwardly therefrom and a second tab extending outwardly from an opposite side of the crank pin. At least one of the first and second tabs extends through an opening from the slot of the split sleeve. The split sleeve has a first portion and a second portion with an interior area formed between the first and second portions. One of the first and second tabs extends outwardly into the interior area between the first and second portions. Each of the first and second tabs has a chamfered edge (on the same side) tapering away from the generally rectangular configuration. The slot is formed interior of the split sleeve and the opening extends outwardly from opposite sides of the slot.

The insert key is positioned so as to reside within the interior of the rod's upper bearing cap area and so as to contact the tabs as the crankshaft rotates. The piston rod is secured to the split sleeve by split caps affixed around the split sleeve. The insert key is received by one of the split caps. Specifically, the insert key includes an edge which is received within the interior area of the split sleeve. This edge has a tapered edge extending further into the interior area than the remainder of the insert key.

DETAILED DESCRIPTION OF THE INVENTION

Figure 1:
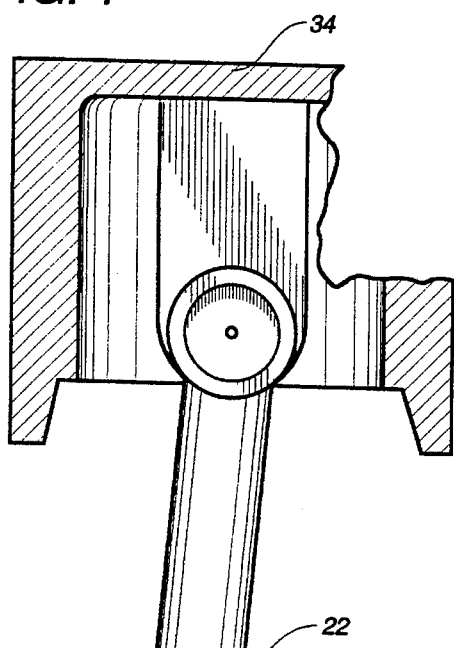
FIG. 1 is a side elevational view of the crank apparatus of the present invention.

Referring to FIG. 1, there is shown at 10 the improved crank apparatus in accordance with the preferred embodiment of the present invention. The improved crank apparatus 10 includes a crankshaft 12, an arm 14, a crank pin 16, a split sleeve 18, an insert key 20, a piston rod 22 and split caps 24.

As can be seen in FIG. 1, the crankshaft 12 is in the form of a standard crankshaft used on a diesel engine. The arm 14 extends outwardly from the crankshaft 12 so as to rotate with the rotation of the crankshaft 12. The crank pin 16 is affixed to the arm 14. The crank pin 16 has a generally rectangular configuration and cross-section. The crank pin 16 is received within a slot formed within the split sleeve 18. In particular, the crank pin 16 includes tabs 26 and 28 that extend through openings aligned with the slot of the split sleeve 18. As will be described hereinafter, the sleeve's internal slot opening is able to slide over the crank pin tabs 26 and 28 as the crankshaft 12 rotates. The insert key 20 is received within the rod's first split cap 30. The first split cap 30 serves to secure the insert key 20 within an interior of the split sleeve 18. The first split cap 30 is secured to the second split cap 32 so as to be affixed to the outer diameter of the split sleeve

18. The piston rod 22 extends outwardly from the first split cap 30. The piston rod 22 is connected to a piston 34 at an end opposite the crankshaft 12. The rotation of the crankshaft 12 will cause the piston rod 22 to move upwardly and downwardly so as to cause a movement of the piston 34 within the cylinder of a diesel engine. It is the special configuration of the split sleeve 18 with the crank pin 16 that allows the crank apparatus 10 of the present invention to achieve maximum early phase efficiency in the operation of the diesel engine.

Figure 2:
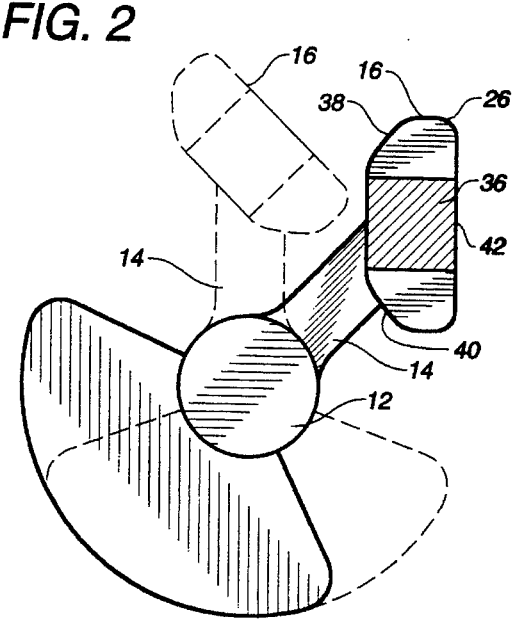
FIG. 2 is an isolated side elevational view of the crankshaft and crank pin of the present invention.
Figure 2:
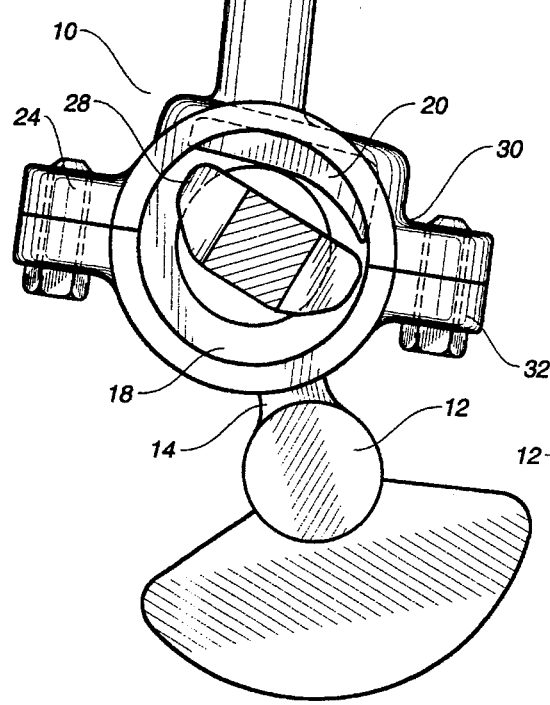

FIG. 2 is an isolated view of the crank pin 16. As can be seen, the crank pin 16 is secured to arm 14 from the crankshaft 12. The crank pin 16 has a cross-section 36 of generally rectangular configuration. Tabs 26 and 28 extend outwardly of this rectangular cross-section. Tab 26 includes a chamfer 38 tapering away from the rectangular cross-section 36. Tab 28 includes a tapered chamfer 40 extending away from the rectangular configuration 36. The flat surface 42 of the crank pin 16 is offset by approximately 45° from the longitudinal axis of the arm 14. Arm 14 extends outwardly radially from the crankshaft 12. As can be seen by the phantom line drawing of the crank pin 16 in FIG. 2, the crank pin 16 will retain its orientation, with respect to the arm 14 during the entire rotation of the crankshaft 12.

Figure 3:
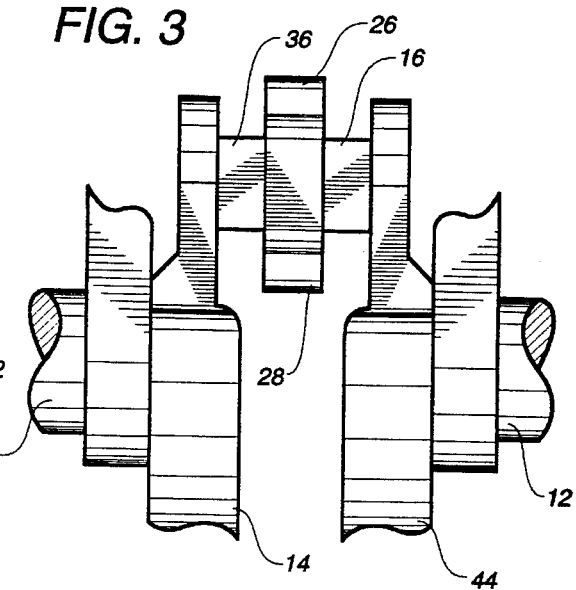
FIG. 3 is an end view of the crankshaft and crank pin of the present invention.

As can be seen in FIG. 3, the crankshaft 12 has a first arm 14 affixed thereto and a second arm 44 affixed thereto in spaced parallel relationship to the first arm 14. The crank pin 16 has its rectangular cross-sectional area 36 extending between the arms 14 and 44. Tabs 26 and 28 extend outwardly from this rectangular cross-section 36. In particular, tabs 26 and 28 are positioned generally centrally between the arms 14 and 44 and in parallel relationship to such arms. As can be seen, the tabs 26 and 28 have a width which is less than the distance between the arms 14 and 44. The crank pin tabs 26 and 28 are only chamfered on the same side. Fundamentally, the present invention is different than conventional crank mechanisms since the crank pin 16 has a rectangular cross-sectional area.

Figure 4:
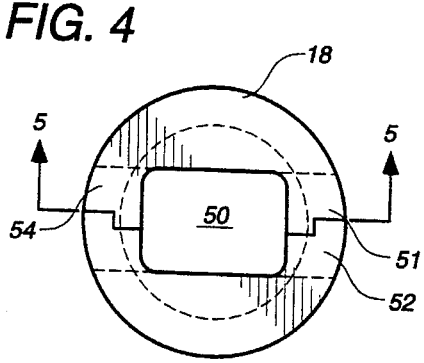
FIG. 4 is an isolated side elevational view of the split sleeve of the present invention.

FIG. 4 illustrates the split sleeve 18 of the crank apparatus 10 of the present invention. It can be seen that the split sleeve 18 includes a central slot 50 formed therein. Slot 50 serves to receive the rectangular cross-section 36 of the crank pin 16. Importantly, the split sleeve 18 includes a first opening 52 extending from one side of the slot 50 and a second opening 54 extending from an opposite side of the slot 50, approximately 180° offset from the first opening 52. Opening 52 generally receives the tab 26 therein. The opening 54 will receive the tab 28 therein. The split sleeve 18 has a generally circular configuration, as seen in FIG. 4. As can be seen in FIG. 4, the split area of the sleeve 18 includes an interlocking male/female step 51. The utilization of the slot 50, with the openings 52 and 54 allows the tabs 26 and 28 to move into and through the openings during the rotation of the crankshaft 12 relative to the movement of the piston rod 22.

Figure 5:
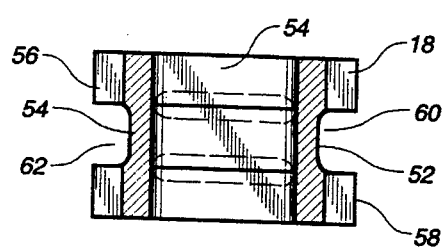
FIG. 5 is a cross-sectional view taken across lines 5—5 of FIG. 4.

FIG. 5 is a cross-sectional view of the split sleeve 18. Importantly, the split sleeve 18 includes a first circular portion 56 and a second circular portion 58. A slot ring 60 is disposed between the first circular portion 56 and the second circular portion 58. The slot ring 60 will have a lesser diameter than the portions 56 and 58. An interior area 62 is defined by the inner surfaces of the portions 56 and 58 and by the outer diameter of the slot ring 60. The slot 50 extends through the thickness of the split sleeve 18. The openings 52 and 54 will extend through the wall of the slot ring 60.

Figure 6:
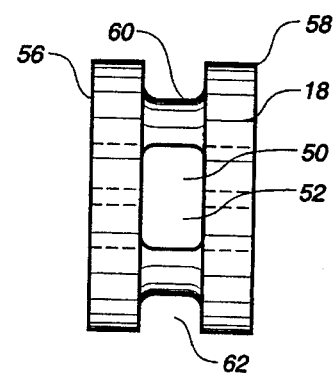
FIG. 6 is an end view of the split sleeve of the present invention.

FIG. 6 is an end view of the split sleeve 18. As can be seen in FIG. 6, there is a first circular portion 56 and a second circular portion 58 with the slot ring 60 formed therebetween. The interior area 62 is shown as defined by the inner surfaces of the portions 56 and 58 and the outer diameter of the slot ring 60. Rectangular slots 50 and opening 52 are illustrated in FIG. 6.

Figure 7:
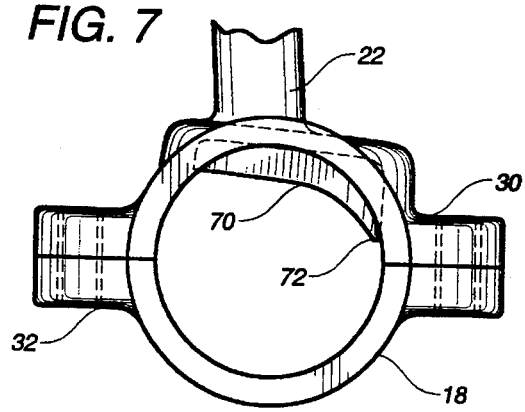
FIG. 7 is an isolated side elevational view showing the relationship of the insert key with the piston rod of the present invention.

FIG. 7 shows an isolated view of the insert key 20 as secured within the first split cap 30 and positioned within the interior area 62 of the split sleeve 18. Piston rod 22 extends vertically upwardly from the top surface of the split cap 30. The split cap 30 is bolted to the second split cap 32 and is bearingly secured to the outer diameter of the split sleeve 18. As such, the piston rod 22 will move with the movement of the split sleeve 18.

As can be seen in FIG. 7, the insert key 20 is received within the first split cap 30 and has an edge 70 which extends into the interior area 62 of the split sleeve 18. Edge 70 includes a tapered end 72 which extends outwardly from the generally linear edge 70. The tapered end 72 extends further into the interior area 62 than the rest of the insert key 20. The tapered end 72 serves as a contact point for contact with the tabs 26 and 28 of the crank pin 16.

In FIG. 7, it can be seen that the piston rod 22 has a longitudinal axis which is offset by approximately 75° from the edge 70 of the insert key 20. It has been found that this geometry between the piston rod 22 and the insert key 20 further enhances the efficiency and effectiveness of the crank apparatus 10 of the present invention.

Figure 8:
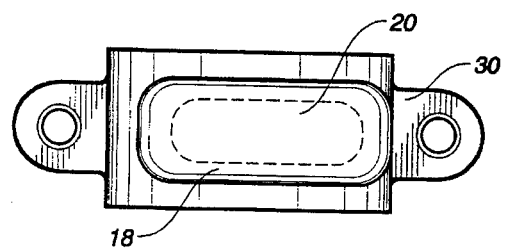
FIG. 8 is a view of the rod's inside bearing showing the cap and key.

FIG. 8 shows how the insert key 20 is disposed within the split cap 30. In particular, it can be seen that the insert key 20 is positioned generally centrally of the split cap 30 so as to be positioned within the interior area 62 of the split sleeve 18.

Figure 9:
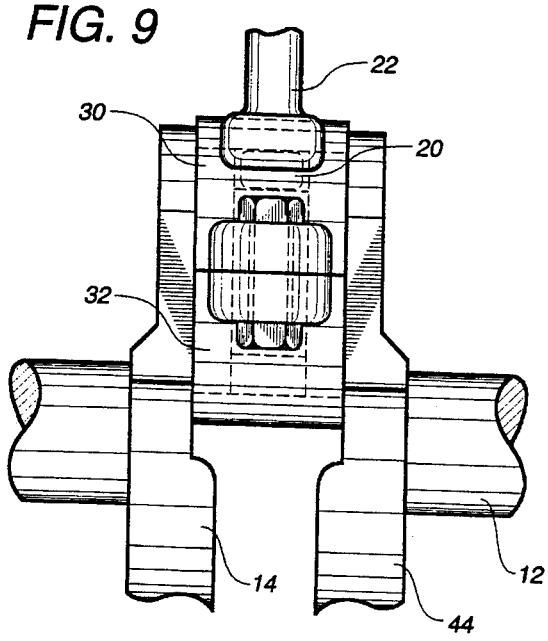
FIG. 9 is an end view of the crank apparatus of the present invention.

In FIG. 9, it can be seen how the first split cap 30 is bolted to the second split cap 32 between the arms 14 and 44. The insert key 20 is shown as received by the first split cap 30. The piston rod 22 extends upwardly from the first split cap 30.

Figure 10:
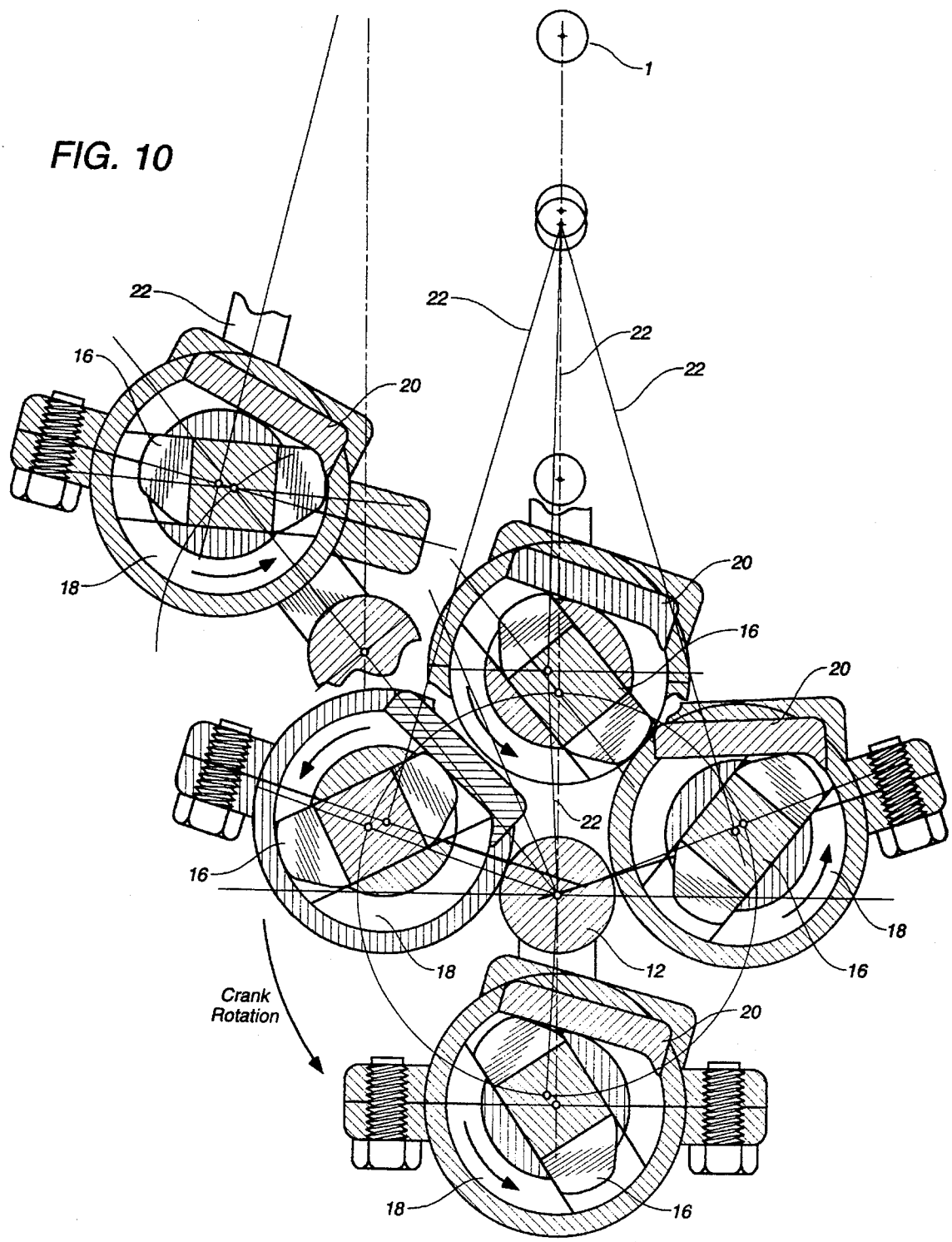
FIG. 10 is an operational view of the crank apparatus of the present invention showing the movement of the crank apparatus during the rotation of the crankshaft.

FIG. 10 illustrates the operation of the crank apparatus of the present invention. In order to improve on the conventional faulty crank apparatus of a diesel engine, the present invention modifies the crank pin's bearing area from a round to a square crank pin 16 with two added extended finger-like tabs 26 and 28 opposite to each other, with radii ends. The crank pin 16, along with the tabs 26 and 28 are enclosed with the split sleeve 18. The centrally located crank pin tabs 26 and 28 act by rubbing on the insert key 20 as a lifting cam-on rod, but does not touch the rod cap's bearing diameter. The special split sleeve 18 includes an elongated rectangular slot 50 in the center which serves to enclose the square crank pin 16 and its tabs 26 and 28. The sleeve's outer one-half diameter area is now the extended new round crank pin and is free to turn inside the rod's bearing surface in the manner of a conventional crank pin.

During the compression and exhaust stage of a four-cycle engine, on the upstroke, the piston rod 22 is being lifted on the upstroke by the action of the insert key cam action by one of the crank pin's finger tabs 26 and/or 28, somewhere about 50° before reaching the top dead center position. At some point near the top dead center's high point, the lower tab has only about 0.002 inches of clearance with the lower rod bearing cap. At this position, the rod 22 is moving up above the crank pin's diameter. This extra rod height of the piston rod gives it that extra vector force for the first 10° and beyond to about 30°. Thereafter, the crank pin 16 with the sleeve 18 turns to a horizontal position, thereafter acting like a conventional crank. During the exhaust stage, the piston rod is prevented from moving higher by the contact of the tab with the lower rod cap bearing (as a stop).

This special sleeve and crank pin arrangement, as a unit, gives the crank apparatus 10 the ability to change its stroke height and diameter size at about the top dead center position, but not at the bottom of the stroke, due to the chamfered tab-causing rod drop.

At 2° to 5° past the top dead center position, the piston rod 22, in a non-moving state, can be pushed down with little effort. This is not the case with the conventional crank, even at 10° to 15°.

Importantly, the present invention has the crank pin 16 offset at about 45° to its arm 14 and the crank pin's center line which is 2° advance position to the rod's center line. But the rod's throw arms are actually 12° past top dead center—a torque gain of 12° at this 2° point from the top dead center. Additionally, the outer diameter of the sleeve 18 turns inside the bearing of the piston rod 22 as the crank pin gives the rod a conventional sliding action.

The foregoing disclosure and description of the invention is illustrative and explanatory thereof. Various changes in the details of the illustrated configuration can be made within the scope of the appended claims without departing from the true spirit of the invention. The present invention should only be limited by the following claims and their legal equivalents.

I claim:

1. An improved crank apparatus for a diesel engine comprising:

a crankshaft;

an arm extending outwardly of the crankshaft;

a crank pin affixed to said arm, said crank pin having a generally rectangular configuration, said crank pin having a first tab extending outwardly therefrom and a second tab extending outwardly from an opposite side of said crank pin;

a split sleeve having an elongated slot formed therein, said slot receiving said crank pin therein, at least one of said first and second tabs extending through an opening from said slot of said split sleeve, said split sleeve having a first portion and a second portion, said split sleeve having an interior area between said first and second portions, said at least one of said first and second tabs extending outwardly into said interior area between said first and second portions, said slot formed interior of said split sleeve, said opening extending outwardly from opposite sides of said slot, said crank pin movable through said opening relative to a rotation of the crankshaft; and a piston rod bearingly interconnected to said split sleeve, said piston rod having an insert key connected thereto and residing within said split sleeve in a position so as to contact said crank pin upon a rotation of the crankshaft, said insert key positioned so as to have a portion residing within said interior area between said first and second portions of said split sleeve.

2. The apparatus of claim 1, each of said first and second tabs having a chamfered edge tapering away from said generally rectangular configuration.

3. The apparatus of claim 1, said piston rod secured to said split sleeve by split caps bearingly affixed around said split sleeve, said insert key received by one of said split caps.

4. The apparatus of claim 1, said piston rod comprising:

a first split cap and a second split cap bearingly secured around said split sleeve; and a rod extending outwardly from said first split cap, said rod having a longitudinal axis extending therethrough, said insert key having a longitudinal axis offset by approximately 75° from said longitudinal axis of said rod.

5. The apparatus of claim 1, said arm comprising:

a first arm affixed to the crankshaft; and a second arm affixed to the crankshaft in spaced parallel relationship to said first arm, said crank pin extending between said first and second arms.

6. The apparatus of claim 5, said first and second arms having an axis extending radially outwardly from the crankshaft, said crank pin having a flat surface offset by approximately 45° or less from said axis of said arms.

7. The apparatus of claim 5, said crank pin having a portion with a rectangular cross-section extending between said first and second arms, said crank pin having said first tab extending outwardly from said portion of said rectangular cross-section in parallel relationship to said first and second arms, said first tab having at least one chamfered edge.

8. The apparatus of claim 7, said crank pin having said second tab extending outwardly from said portion of said rectangular cross-section, said second tab on an opposite side of said portion than said first tab, said second tab in parallel relationship to said first and second arms.

9. The apparatus of claim 8, said first and second tabs being positioned centrally between said first and second arms, said first and second tabs having a width less than a distance between said first and second arms.

* * * * *